(12) United States Patent
Little et al.

(10) Patent No.: US 9,322,337 B2
(45) Date of Patent: Apr. 26, 2016

(54) AERODYNAMIC INTERCOMPRESSOR BLEED PORTS

(71) Applicant: United Technologies Corporation, Hartford, CT (US)

(72) Inventors: Jonathan D. Little, West Hartford, CT (US); Kevin J. Cummings, West Hartford, CT (US); Paul S. Schweiger, Manchester, CT (US); Daniel J. Monahan, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 191 days.

(21) Appl. No.: 13/644,597

(22) Filed: Oct. 4, 2012

(65) Prior Publication Data
US 2013/0340441 A1   Dec. 26, 2013

Related U.S. Application Data

(63) Continuation-in-part of application No. 13/527,887, filed on Jun. 20, 2012.

(51) Int. Cl.
   *F02C 9/18*    (2006.01)
   *F04D 29/52*   (2006.01)
   *F04D 27/02*   (2006.01)

(52) U.S. Cl.
   CPC ............... *F02C 9/18* (2013.01); *F04D 27/023* (2013.01); *F04D 27/0215* (2013.01); *F04D 29/522* (2013.01); *Y02T 50/671* (2013.01)

(58) Field of Classification Search
   CPC ............... F02C 6/08; F02C 9/18; F02C 9/52; F04D 27/0207; F04D 27/0215; F04D 27/023; F02K 3/02

USPC .......................................... 60/782, 785, 795
See application file for complete search history.

(56) References Cited

U.S. PATENT DOCUMENTS

| | | | |
|---|---|---|---|
| 4,711,084 A * | 12/1987 | Brockett | 60/785 |
| 5,160,248 A | 11/1992 | Clarke | |
| 5,203,162 A * | 4/1993 | Burge | 60/785 |
| 5,279,109 A | 1/1994 | Liu et al. | |
| 5,380,151 A | 1/1995 | Kostka et al. | |
| 5,380,155 A | 1/1995 | Varsik et al. | |
| 5,458,343 A | 10/1995 | Dornfeld et al. | |
| 5,649,419 A | 7/1997 | Schaut | |
| 6,086,326 A | 7/2000 | Honda et al. | |
| 6,092,987 A | 7/2000 | Honda et al. | |
| 6,106,227 A | 8/2000 | Honda et al. | |
| 6,148,518 A | 11/2000 | Weiner et al. | |
| 6,203,273 B1 | 3/2001 | Weiner et al. | |
| 6,561,760 B2 * | 5/2003 | Wadia et al. | 415/145 |
| 6,619,913 B2 | 9/2003 | Czachor et al. | |

(Continued)

OTHER PUBLICATIONS

The International Search Report mailed Dec. 27, 2013 for International Application No. PCT/US2013/063247.

*Primary Examiner* — Phutthiwat Wongwian
*Assistant Examiner* — Jason H Duger
(74) *Attorney, Agent, or Firm* — Kinney & Lange, P.A.

(57) ABSTRACT

An air bleed system for a gas turbine engine includes an annular bleed case with a manifold therein. The annular bleed case has a forward section and an aft section and ligaments connecting the two sections. The forward section, the aft section and the ligaments define bleed ports. The manifold is disposed radially outward of the ligaments and communicates with the series of bleed ports.

8 Claims, 7 Drawing Sheets

(56) References Cited

U.S. PATENT DOCUMENTS

| | | |
|---|---|---|
| 6,622,475 B2 | 9/2003 | Brault et al. |
| 6,783,324 B2 * | 8/2004 | Muny .................. 415/144 |
| 6,802,691 B2 | 10/2004 | Chlus |
| 6,899,513 B2 | 5/2005 | Eleftheriou |
| 7,025,563 B2 | 4/2006 | Servadio et al. |
| 7,249,929 B2 * | 7/2007 | Cummings et al. ........ 415/144 |
| 7,624,581 B2 * | 12/2009 | Moniz .................. 60/785 |
| 7,850,419 B2 | 12/2010 | Vrljes et al. |
| 7,946,104 B2 | 5/2011 | Frank et al. |
| 8,066,479 B2 | 11/2011 | El-Aini et al. |
| 2005/0135928 A1 | 6/2005 | Servadio et al. |
| 2008/0199301 A1 | 8/2008 | Cardarella, Jr. |
| 2008/0232951 A1 | 9/2008 | Cardarella |
| 2009/0180872 A1 | 7/2009 | Lundgren |
| 2010/0043447 A1 | 2/2010 | Kirby |
| 2011/0154830 A1 | 6/2011 | Bowman et al. |

* cited by examiner

US 9,322,337 B2

AERODYNAMIC INTERCOMPRESSOR BLEED PORTS

CROSS-REFERENCE TO RELATED APPLICATION(S)

This application is a continuation-in-part of application Ser. No. 13/527,887 filed Jun. 20, 2012, and entitled MACHINED AERODYNAMIC INTERCOMPRESSOR BLEED PORTS, which is assigned to the same assignee as the present application. Application Ser. No. 13/527,887 is hereby incorporated by reference.

BACKGROUND

The subject matter of the present disclosure relates generally to gas turbine engines. More particularly, the subject matter of the present disclosure relates to an improved system for bleeding air from a gas turbine engine low pressure compressor chamber and a method of making same.

Gas turbine engines such as those used on jet aircraft and industrial gas turbines generally comprise an air inlet, a single or multi-stage compressor chamber, a combustion chamber aft (downstream) of the compressor chamber, a turbine and an exhaust nozzle. Air entering the inlet flows axially through the compressor chamber and into the combustion chamber where it provides oxygen for fuel ignition. As the air passes through the various stages of the compressor its pressure increases. Under certain conditions, such as when the engine is throttled back or during start up, the amount of air required in the combustion chamber is less than that flowing through the compressor chamber. Under these conditions an engine surge may occur, endangering the operation of the aircraft. To mitigate or eliminate engine surges, an air bleed system may be provided within the compression section to temporarily bleed off air and reduce air flow entering the combustion chamber.

Thus there is a need for an air bleed system that includes an annular bleed case with integral structural ligaments that not only provide structural support to the bleed case, but also are aerodynamically designed and oriented with respect to the air flow coming off the compressor rotor to maximize air flow through the bleed ports and reduce pressure loss across the system.

There also is a need for an improved air bleed system that is machined rather than cast for lighter weight and to provide ligaments having a unique geometry and greater strength.

There is also a need for an improved air bleed system that not only directs air out of the engine cavity but also can withstand major engine case loads and support the engine core.

SUMMARY

An air bleed system for a gas turbine engine includes an annular bleed case with a manifold therein. The annular bleed case has a forward section and an aft section and ligaments connecting the two sections. The forward section, the aft section and the ligaments define bleed ports. The manifold is disposed radially outward of the ligaments and communicates with the series of bleed ports.

In another aspect, a gas turbine engine includes a bleed case having a manifold therein. The manifold communicates with a plurality of bleed ports that extend through the bleed case to communicate with a core inlet of the gas turbine engine.

In yet another aspect, an air bleed system for a gas turbine engine includes an annular bleed case with a manifold therein. The bleed case having a forward section and an aft section and ligaments connecting the two sections. The forward section, the aft section and the ligaments defining a series of bleed ports circumferentially disposed around the bleed case. The manifold is disposed radially outward of the ligaments and extends circumferentially to communicate with the series of bleed ports.

DETAILED DESCRIPTION

Broadly stated, the present invention is an improved air bleed system for a gas turbine engine having one or more compressor stages. The air bleed system may be located in the aft portion of the low pressure compressor chamber and comprises a movable bleed valve and a stationary, annular bleed case having a forward section and an aft section and ligaments connecting the two sections. The ligaments along with the forward and aft section define a plurality of bleed ports. A manifold is formed in the area between an outer radial surface of ligaments and the forward and aft portions of the bleed case. The manifold communicates with the plurality of bleed ports to allow for circumferential flow between the bleed ports via an opening or gap radially outward of the ligaments. The manifold reduces bleed cavity recirculation, cavity air velocities and mach number through bleed ports. Additionally, the manifold reduces total pressure loss and reduces upstream and downstream disturbances to the main flow field adjacent rotor blade stage positioned forward and aft of the bleed ports.

Engine Principles

A gas turbine engine works by forcing compressed air into a combustion chamber where it is mixed with fuel and ignited so that the exhaust gases exit a downstream nozzle, thereby creating thrust (or power in the case of industrial gas turbine engines).

Figure 1:
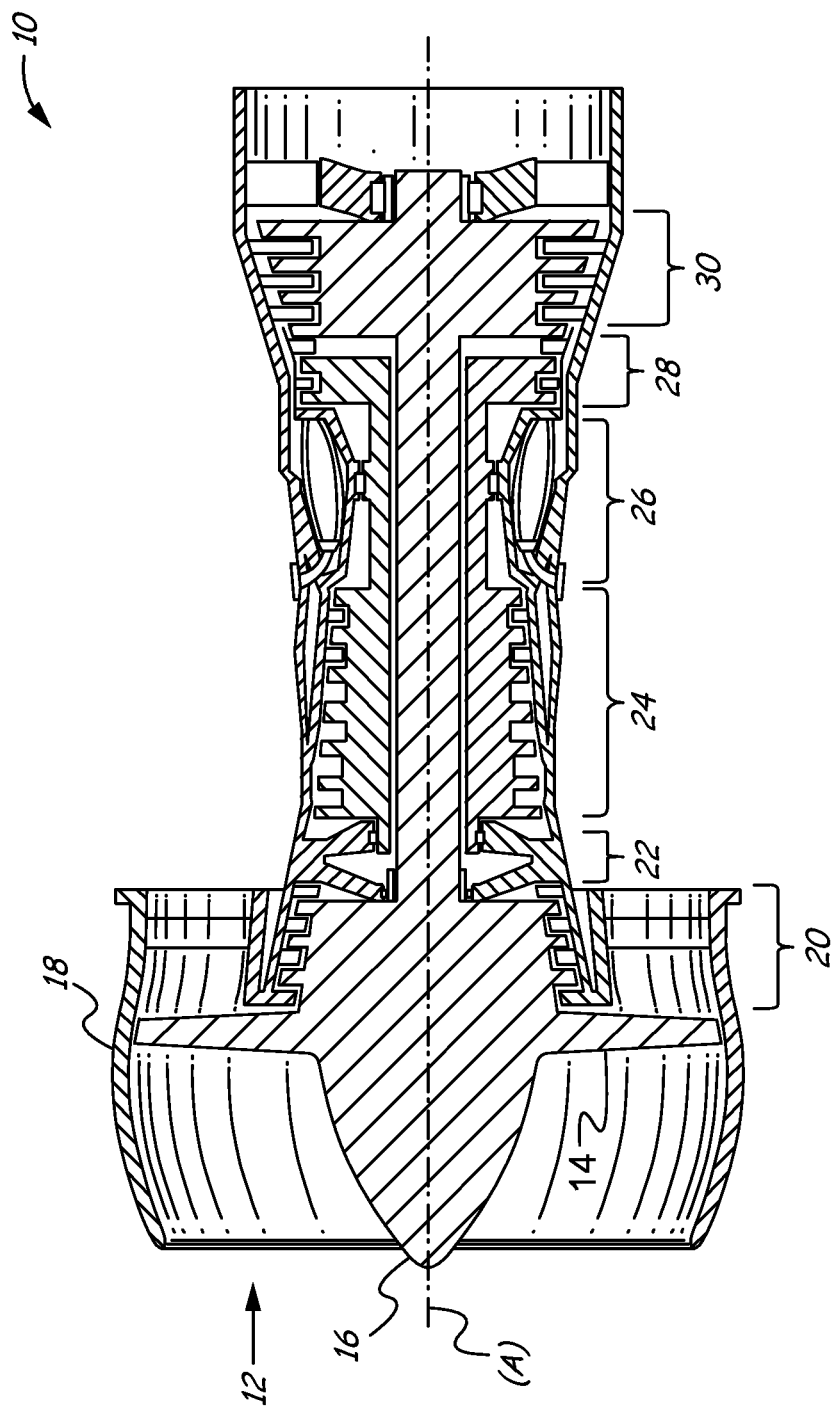
FIG. 1 is a longitudinal sectional view of an exemplary turbofan jet engine that may be equipped with the air bleed system of the present invention.

FIG. 1 is a longitudinal sectional view of an exemplary turbofan jet engine 10 that may be equipped with the air bleed system of the present invention. Although described in reference to jet engine 10, it is understood that an industrial gas turbine engine may be equipped with the air bleed system of the present invention as well.

The engine 10 comprises an air intake port 12, a fan 14 mounted on a hub 16 near the air intake port 12 and surrounded by a fan case 18 which is mounted within an engine housing (not shown), a low pressure compressor (LPC) chamber 20, an intermediate section 22 aft of the LPC chamber 20, a high pressure compressor (HPC) chamber 24, a combustion chamber or combustor 26, high and low pressure turbines 28, 30 that provide rotational power to the fan 14 and compressor blades, and an exhaust outlet 32.

Figure 2:
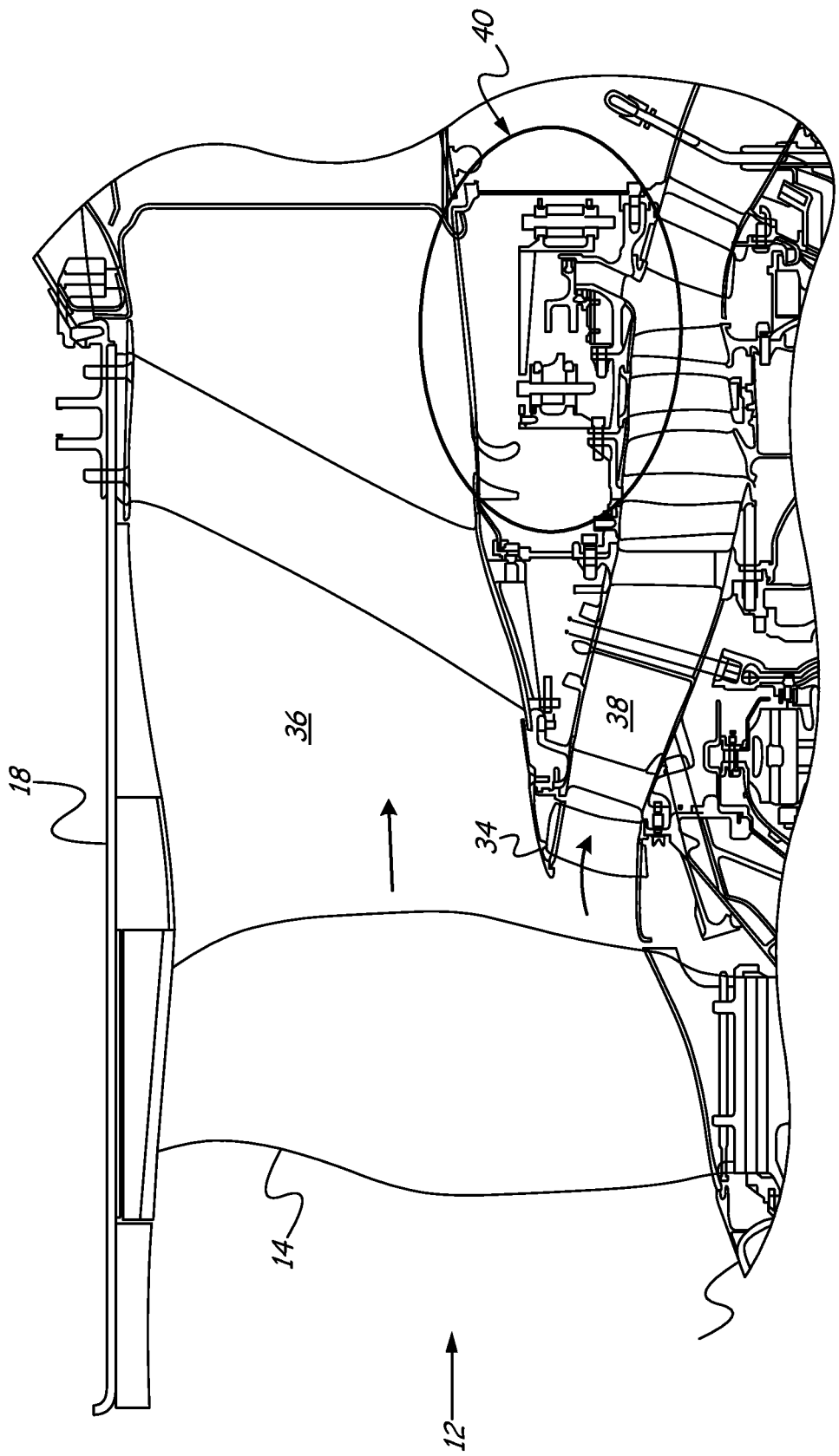
FIG. 2 is a cross sectional view of a portion of a turbofan jet engine similar to the one in FIG. 1, showing an air bleed system according to the present invention.

As best shown in FIG. 2, a stationary, annular shaped splitter 34 circumferentially disposed around the hub 16 and behind the fan 14 divides (channels) the air entering the air intake port 12 into either a relatively larger fan duct 36 outboard of the splitter 34 (away from the engine core), or into a relatively smaller engine core inlet 38 located inboard of the splitter 34. The air passing through the fan duct 36 bypasses the engine core and travels directly to the exhaust outlet 32 (FIG. 1) where it provides some of the engine thrust.

The air diverted by the splitter 34 into the engine core inlet 38 travels into the HPC chamber 24 where it undergoes further compression, then into the combustion chamber 26 where it is mixed with fuel to produce combustion gases which pass through the turbines 28, 30 and then exit through the exhaust nozzle 32 to provide the majority of the engine thrust.

Under certain conditions, such as when the engine is throttled back or during start up, the amount of air required in the combustion chamber 26 is less than that flowing through the engine core inlet 38. Under these conditions an engine surge may occur, endangering the operation of the aircraft. To mitigate or eliminate surges, an air bleed system 40 is provided within the LPC chamber 20 to bleed off air and temporarily reduce air flow entering the combustion chamber 26. For stability and operability, air passing through the engine core inlet 38 may be bled off within the LPC chamber 20 (at station 2.5) through air bleed port passageways 52 (FIGS. 2-6) and out into the surrounding fan duct 36.

The Invention

The present invention is an air bleed system 40 for bleeding off air from the engine core inlet 38 into the fan duct 36 that increases bleed flow, minimizes or eliminates pressure loss across the air bleed system, and thus improves the stability of the low pressure compressor 20, and achieves these objectives within a narrow section of the engine (station 2.5). The air bleed system 40 preferably is located in front of the engine 10 in the aft portion of the LPC chamber 20 (at station 2.5) upstream of the intermediate section 22 and the HPC chamber 24.

FIG. 2 is a cross sectional view of a portion of a turbofan jet engine similar to the one in FIG. 1, showing an air bleed system 40 according to the present invention. The air bleed system 40 is shown in the LPC chamber 20 aft of the splitter 34 and is circumferentially disposed around the engine hub 16. The air bleed system 40 is normally closed during aircraft flight and is only opened when the amount of air required to the combustion chamber is less that that flowing through the compressor, for example, when the engine is throttled back or during start up.

Figure 3:
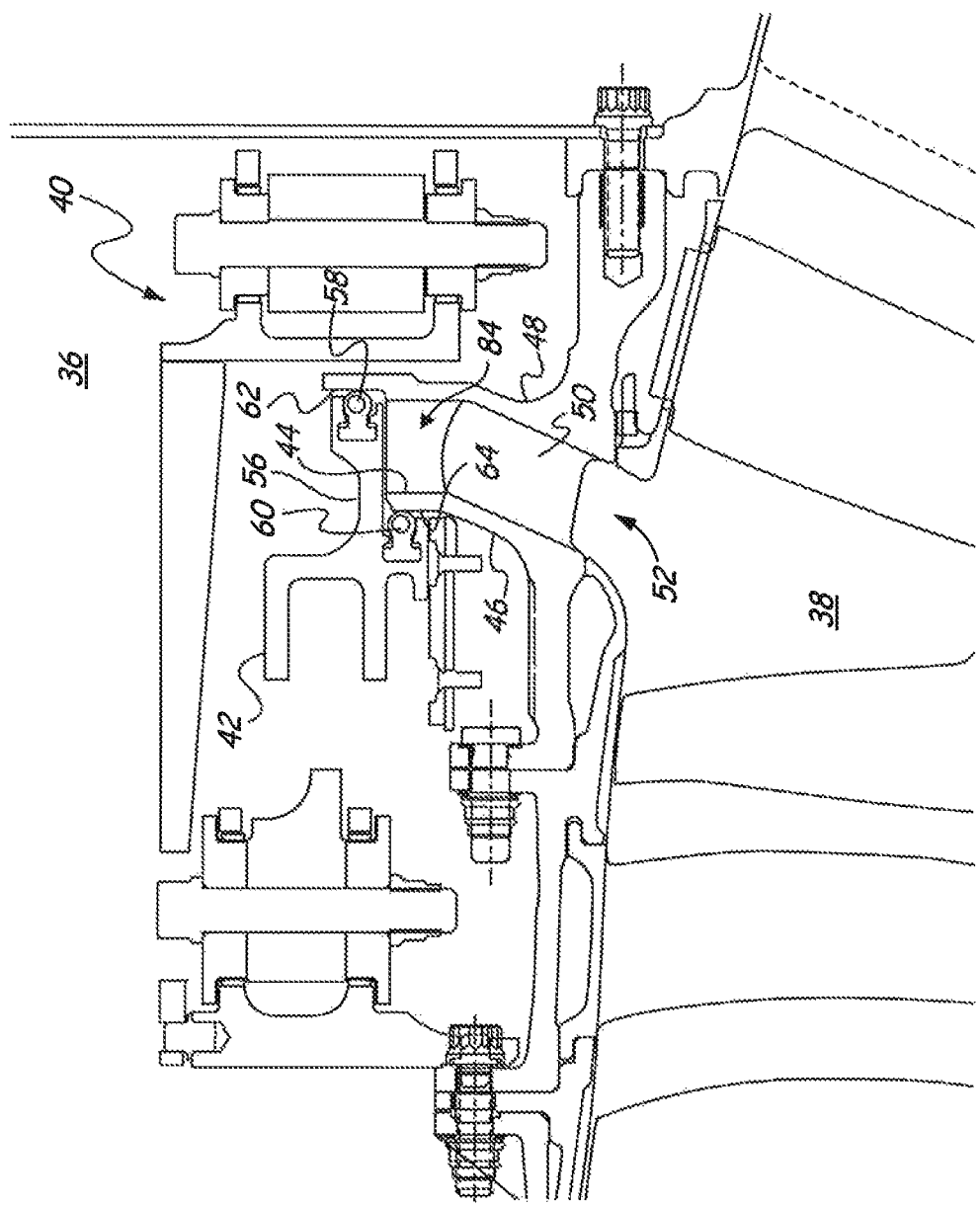
FIG. 3 is a close up cross sectional view of the air bleed system of FIG. 2 shown in the closed position.
Figure 4:
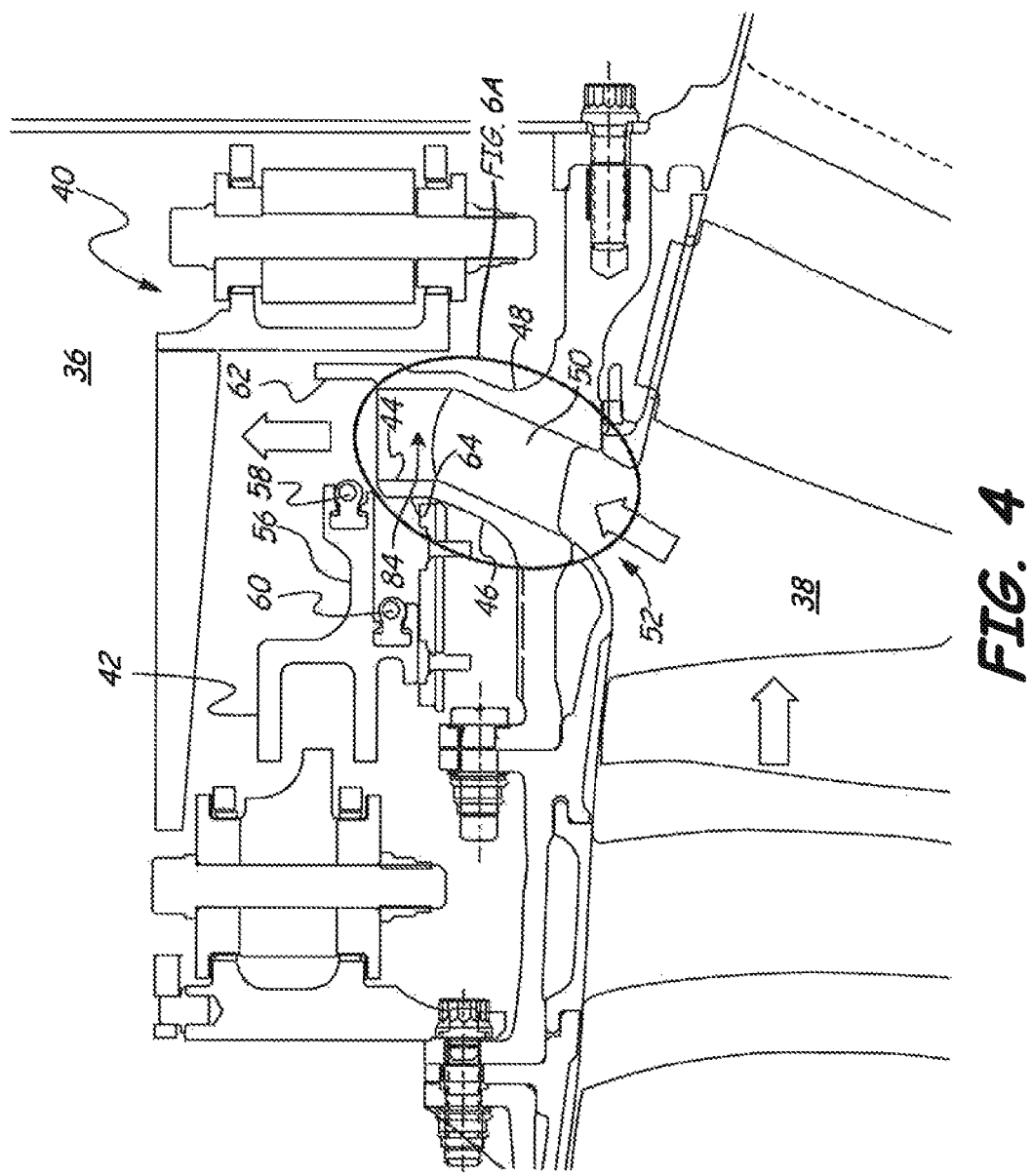
FIG. 4 is a close up cross sectional view of the air bleed system of FIG. 2 shown in the open position.

As perhaps best shown in FIGS. 3 and 4, the air bleed system 40 comprises a movable bleed valve 42 and a stationary, annular bleed case 44. The bleed valve 42 comprises an annular body 56 that carries a first set of seals (sealing segments) 58 and a second set of seals (sealing segments) 60. The multiple sealing segments 58, 60 are arranged circumferentially around the bleed valve body 56 (within the LPC chamber 20) to seal off every bleed port 52 simultaneously.

The bleed valve 42 is positioned upstream of the bleed case 44 and is movable via linkages in an axial direction between a closed position shown in FIG. 3 in which the bleed valve 42 seals (closes off) the bleed ports 52, and an open position shown in FIG. 4, in which air can pass through the bleed ports 52 into the fan duct 36. In typical operation the bleed valve 42 will be closed.

When in the closed position shown in FIG. 3 the first set of seals 58 engages an inner wall 62 of the rearward section 48 of the bleed case 44 and the second set of seals 60 engages an outer wall 64 of the forward section 46 of the bleed case 44, thereby closing the bleed ports 52.

When in the open position shown in FIG. 4 the bleed valve 42 is pulled back, forward (upstream) of the bleed ports 52. The seals 58, 60 are disengaged from the sealing surfaces 62, 64, allowing air to be bled off the engine core inlet 38 and out into the fan duct 36. Air bled out of the low pressure compressor (via the air bleed ports 52) travels through louvers (not shown) and back into the fan duct air stream 36.

Figure 6:
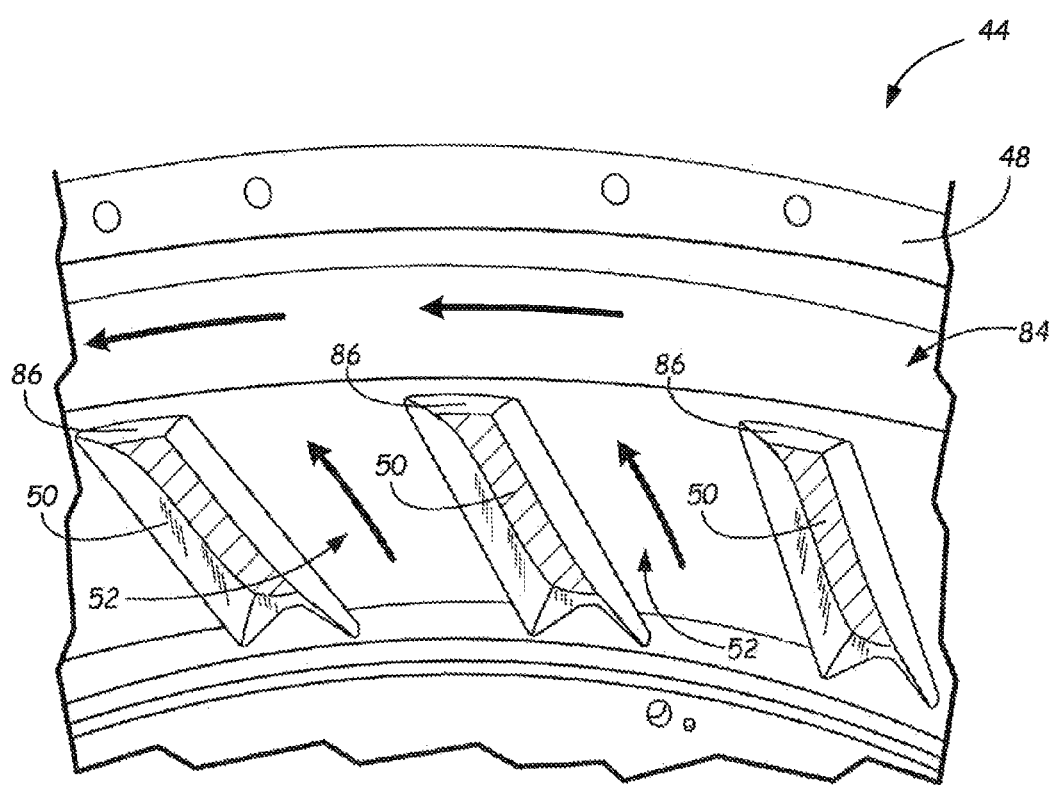
FIG. 6 is cross-sectional view of a plurality of bleed ligaments and a manifold.

The bleed valve 42 is activated by a single actuator and both translates and rotates during operation. That is to say, the bleed valve 42 moves both in an axial direction and in a rotational manner during operation, similar to a threaded cap. This dual motion capability is made possible by a system of linkages 82 located outboard of the bleed ports 52 (FIG. 6).

Figure 5:
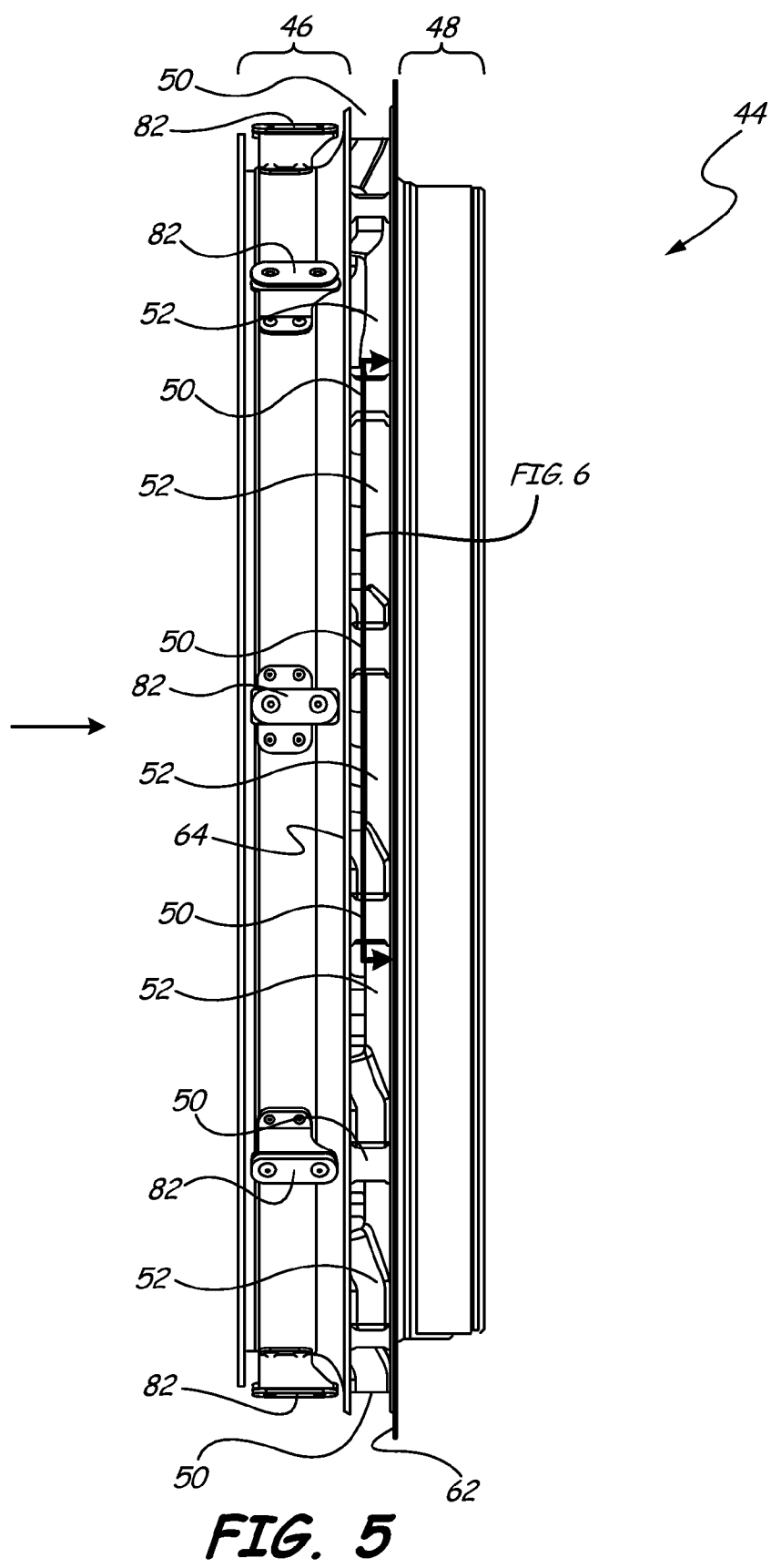
FIG. 5 is a side view of a bleed case, a main component of the air bleed system of FIG. 2.

FIG. 5 is a side view of a bleed case 44. The bleed case 44 has a forward section 46 and an aft section 48 and ligaments 50 connecting the two sections. The ligaments 50 provide structural support (by connecting the two sections 46, 48), but also incorporate a unique aerodynamic design as explained in detail below. The bleed case 44 is positioned symmetrically around the engine longitudinal axis (A) (indicated by the arrow in FIG. 5) so that it circumscribes the compressor air flow path. The bleed case 44 may comprise any suitable number of ligaments 50. Together the bleed case 44 and the ligaments 50 define a series of slots or bleed ports 52 circumferentially disposed around the bleed case 44 through which air can be bled from the engine core inlet 38 into the fan duct 36.

The number of ligaments 50 can vary, as can the total bleed area, defined as the cumulative areas of the bleed ports 52. In one embodiment of the invention having fifteen load carrying ligaments 50 for meeting backbone stiffness requirements, the total bleed area was 45 square inches.

The size of the ligaments 50 is a function of a number of factors, including their required structural strength and the required bleed port area (air passage area) under all expected operations. For example, the total bleed area for the illustrated bleed case 44 is 45 square inches, defined as the sum of the areas of the bleed port inlets. The width of the ligament shown in FIG. 9 is about 0.930 inches as measured along a line normal to the first and second surfaces 70, 72, but could vary according to need.

While the invention above has been described as having fifteen ligaments, each angled at 36 degrees from a longitudinal plane, it should be understood that the number, height, length and width of the ligaments, as well as the angle cut, may be varied according to need. The number and dimensions of the ligaments needs to be aerodynamically or acoustically tuned to the other adjacent hardware in the compressor to minimize excitations and vibrations.

Figure 6A:
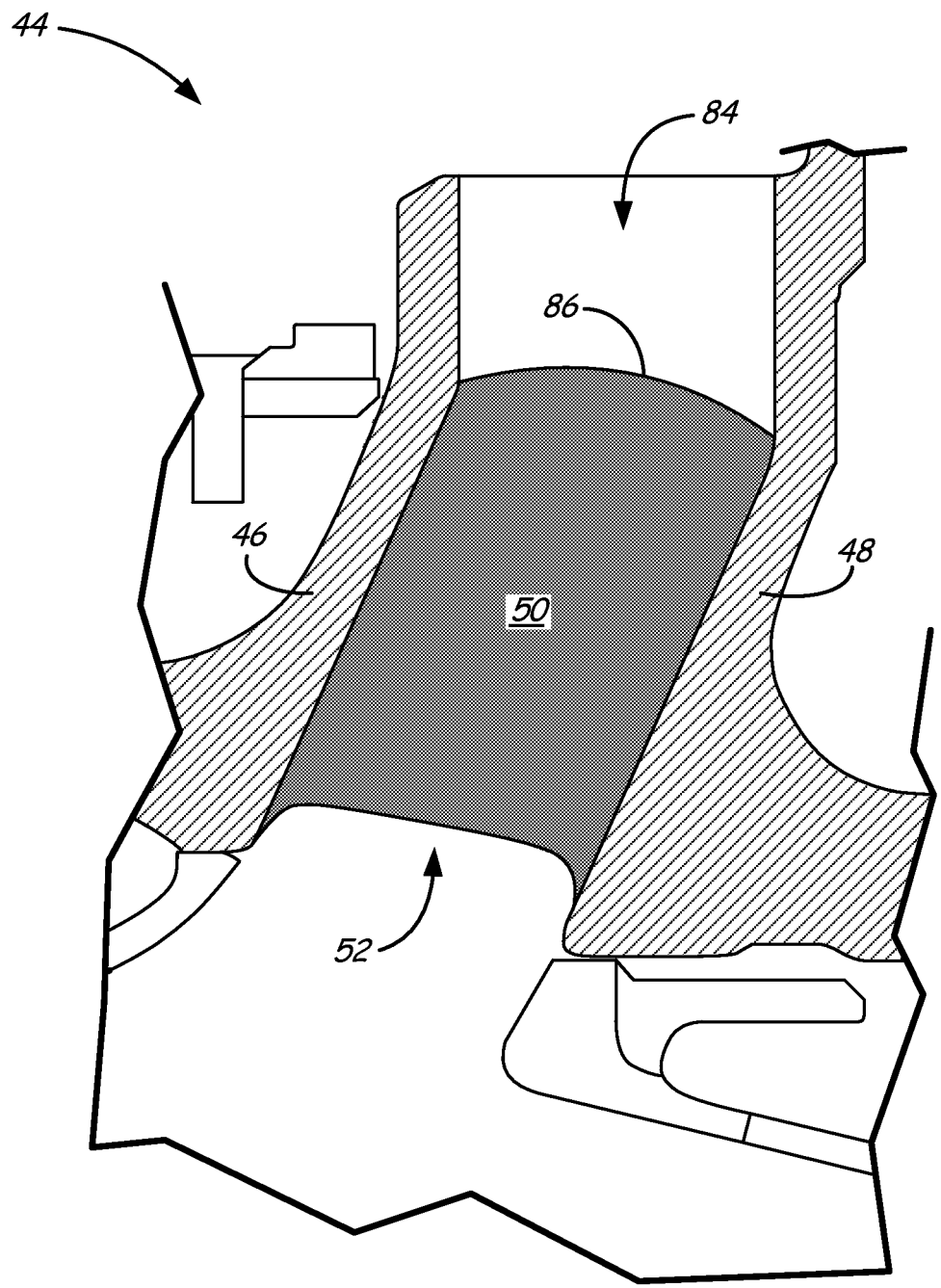
FIG. 6A is an enlarged cross sectional view of the air bleed system of FIG. 4.

FIG. 6 is a sectional view through ligaments 50 and bleed ports 52 viewing aft section 48 of the bleed case 44. FIG. 6A is an enlargement of a portion of bleed case 44 including forward section 46 and aft section 48 (both shown in cross-hatch). FIGS. 6 and 6A additional illustrate a manifold 84 positioned radially outward of an outer radial surface 86 of each ligament 50 (shown stippled in FIG. 6A).

The ligaments 50 have an outer radial surface 86 that is disposed inward radially from the outer radial extent of the bleed case 44 (FIG. 6A) and the annular body 56 (FIG. 3) of the bleed valve 42 (FIG. 3). Thus, manifold 84 is formed in the area or gap between the outer radial surface 86 of ligaments 50, the forward and aft portions of the bleed case 44, and the bleed valve 42 (when the bleed valve is closed). The manifold 84 has a circumferential shape and extends about the circumference of bleed case 44 and communicates with the plurality of bleed ports 52.

In operation, the manifold 84 allows for circumferential flow between the bleed ports 52. This reduces bleed cavity recirculation, cavity air velocities and mach number through bleed ports 52. Additionally, manifold 52 reduces total pressure loss and upstream and downstream disturbances to the main flow field adjacent rotor blade stage (FIGS. 2 and 3) positioned just forward and aft of bleed ports 52. The benefits of the invention are also applicable to cast bleed ducts in addition to machined bleed ducts.

The present invention is an improved air bleed system for a gas turbine engine having one or more compressor stages. The air bleed system may be located in the aft portion of the low pressure compressor chamber and comprises a movable bleed valve and a stationary, annular bleed case having a forward section and an aft section and ligaments connecting the two sections. The ligaments along with the forward and aft section define a plurality of bleed ports. A manifold is formed in the area between an outer radial surface of ligaments and the forward and aft portions of the bleed case. The manifold communicates with the plurality of bleed ports to allow for circumferential flow between the bleed ports via an opening or gap radially outward of the ligaments. The circumferential flow the manifold allows for reduces bleed cavity recirculation, cavity air velocities and mach number through bleed ports. Additionally, the circumferential flow the manifold allows for reduces total pressure loss and reduces upstream and downstream disturbances to the main flow field adjacent rotor blade stage positioned forward and aft of bleed ports.

Discussion of Possible Embodiments

The following are non-exclusive descriptions of possible embodiments of the present invention.

An air bleed system for a gas turbine engine includes an annular bleed case with a manifold therein. The annular bleed case has a forward section and an aft section and ligaments connecting the two sections. The forward section, the aft section and the ligaments define bleed ports. The manifold is disposed radially outward of the ligaments and communicates with the series of bleed ports.

The air bleed system of the preceding paragraph can optionally include, additionally and/or alternatively, any one or more of the following features, configurations and/or additional components:

the manifold extends circumferentially about a circumference of the bleed case;

the manifold is formed between the forward and aft sections of the bleed case and an outer radial surface of the ligaments; and a bleed valve mounted to the bleed case, and the manifold is additionally bounded by the bleed valve when the bleed valve is in a closed position.

A gas turbine engine includes a bleed case having a manifold therein. The manifold communicates with a plurality of bleed ports that extend through the bleed case to communicate with a core inlet of the gas turbine engine.

The gas turbine engine of the preceding paragraph can optionally include, additionally and/or alternatively, any one or more of the following features, configurations and/or additional components:

ligaments connect a forward section of the bleed case to an aft section of the bleed case, the manifold is disposed radially outward of the ligaments;

the manifold is formed between the forward and aft sections of the bleed case and an outer radial surface of the ligaments;

a bleed valve is mounted to the bleed case, and the manifold is additionally bounded by the bleed valve when the bleed valve is in a closed position;

the bleed ports are circumferentially disposed around the bleed case; and the manifold extends circumferentially about a circumference of the bleed case.

An air bleed system for a gas turbine engine includes an annular bleed case with a manifold therein. The bleed case having a forward section and an aft section and ligaments connecting the two sections. The forward section, the aft section and the ligaments defining a series of bleed ports circumferentially disposed around the bleed case. The manifold is disposed radially outward of the ligaments and extends circumferentially to communicate with the series of bleed ports.

The air bleed system of the preceding paragraph can optionally include, additionally and/or alternatively, any one or more of the following features, configurations and/or additional components:

the manifold is formed between the forward and aft sections of the bleed case and an outer radial surface of the ligaments; and a bleed valve mounted to the bleed case, and wherein the manifold is additionally bounded by the bleed valve when the bleed valve is in a closed position.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements

The invention claimed is:

1. An air bleed system for a gas turbine engine, comprising:
an annular bleed case having a forward section, an aft section, ligaments spanning between and connecting an inner surface of the forward section to an inner surface of the aft section, and a series of bleed ports defined by the inner surface of the forward section, the inner surface of the aft section and the ligaments;
a bleed valve mounted to the annular bleed case; and
a manifold disposed radially outward of the ligaments and extending circumferentially about a circumference of the annular bleed case, wherein the manifold is formed between the inner surface of the forward section, the inner surface of the aft section and an outer radial surface of the ligaments, the manifold communicating with the series of bleed ports and allowing circumferential flow between each one of the series of bleed ports, and wherein the manifold is constructed such that the manifold is disposed radially inward of the bleed valve when the bleed valve is in a closed position.

2. An air bleed system for a gas turbine engine, comprising:
a compressor section; and
a bleed case having an inlet and an outlet, the inlet communicating with the compressor section; the bleed case comprising:
a forward section;
an aft section;

ligaments having a forward end, an aft end, an inner radial surface, and an outer radial surface, wherein the forward end is attached to the forward section and the aft end is attached to the aft section, whereby the ligaments span between and connect an inner surface of the forward section to an inner surface of the aft section;

bleed ports defined by the inner surface of the forward section, the inner surface of the aft section, and the ligaments, and wherein the bleed ports communicate with the inlet;

a bleed valve mounted to the bleed case; and a manifold formed within the bleed case adjacent the outlet, wherein the manifold is formed between the inner surface of the forward section, the inner surface of the aft section and the outer radial surface of the ligaments, wherein the manifold extends circumferentially about a circumference of the bleed case, the manifold communicating with and allowing circumferential flow between each one of the bleed ports, wherein the manifold is disposed radially outward of the ligaments, and wherein the manifold is constructed such that the manifold is disposed radially inward of the bleed valve when the bleed valve is in a closed position.

3. The air bleed system of claim 2, wherein the bleed ports are circumferentially disposed around the bleed case.

4. The air bleed system of claim 2, wherein the gas turbine engine comprises a turbofan engine.

5. The air bleed system of claim 2, wherein the gas turbine engine comprises an industrial gas turbine engine.

6. An air bleed system for a gas turbine engine, comprising:
an annular bleed case having a forward section and an aft section and ligaments spanning a gap disposed between an inner surface of the forward section and an inner surface of the aft section whereby each ligament is attached to both the inner surface of the forward section and the inner surface of the aft section such that the ligaments connect the forward section and the aft section; the inner surface of the forward section, the inner surface of the aft section and the ligaments defining a series of bleed ports circumferentially disposed around a circumference of the annular bleed case;

a bleed valve mounted to the annular bleed case; and a manifold formed between the inner surface of the forward section, the inner surface of the aft section and an outer radial surface of the ligaments, the manifold disposed radially outward of the ligaments and extending circumferentially to communicate with and allow circumferential flow between each one of the series of bleed ports, and wherein the manifold is constructed such that the manifold is disposed radially inward of the bleed valve when the bleed valve is in a closed position.

7. The air bleed system of claim 6, wherein the gas turbine engine comprises a turbofan engine.

8. The air bleed system of claim 6, wherein the gas turbine engine comprises an industrial gas turbine engine.

* * * * *